United States Patent Office 3,838,019
Patented Sept. 24, 1974

3,838,019
INHIBITION OF POLYMER FORMATION DURING DISTILLATION OF CRUDE VINYL ACETATE
Wulf Schwerdtel, Cologne-Stammheim, Walter Kronig and Gerhard Scharfe, Leverkusen, and Wolfgang Swodenk, Odenthal-Globusch, Germany, assignors to Bayer Aktiengesellschaft, Leverkusen, Germany
No Drawing. Continuation of abandoned application Ser. No. 870,549, Nov. 5, 1969. This application Mar. 27, 1972, Ser. No. 238,643
Claims priority, application Germany, Nov. 8, 1968, P 18 07 738.8
Int. Cl. B01d 3/34; C07c 67/06
U.S. Cl. 203—8        12 Claims

ABSTRACT OF THE DISCLOSURE

In the purification of vinyl acetate by distillation, free oxygen, preferably diluted as with carbon dioxide, is introduced into the individual vinyl acetate distillation columns to ensure that oxygen is present throughout each distillation column whereby the formation of polymers in the distillation column is substantially avoided. It has proved to be of particular advantage to introduce small quantities of oxygen upwards into the boiler parts of the columns which are normally in the form of circulation evaporators, and it is preferred to use known polymerization inhibitors in conjunction with the oxygen treatment.

This is a continuation of application Ser. No. 870,549 filed Nov. 5, 1969, and now abandoned.

PREAMBLE

Vinyl acetate can be obtained by reacting ethylene, oxygen and acetic acid with the aid of noble metal catalysts or by reacting acetylene with acetic acid. The reaction mixture which accumulates in these processes is a liquid reation mixture which, apart from unreacted acetic acid, consists essentially of the vinyl acetate product. It may also contain small quantities of secondary products which are worked up by distillation. See, for example, U.S. Pats. No. 3,275,680 and 3,190,912.

More pertinently, one method of producing vinyl acetate comprises isolating pure vinyl acetate from a crude reaction mixture obtained by the reaction of ethylene, oxygen and acetic acid in the presence of noble metal catalysts, after it has been liquefied by cooling. In this process, the vinyl acetate formed is azeotropically taken off together with the water as the head product of an azeotropic distillation column, the vinyl acetate reflux being adjusted in such a way that most of the water is removed from the acetic acid left in the sump. Following condensation, the head product from the column is separated into two phases, a lower aqueous phase and an upper crude vinyl acetate phase. The crude vinyl acetate phase passes into a drying column in which the water still dissolved in the crude vinyl acetate is azeotropically removed overhead together with all the relatively low-boiling components. The vinyl acetate which is free from water and all low-boiling components but which still contains high boiling products is left in the sump of this column. This vinyl acetate fraction is then separated by re-distillation from the small quantities of acetic acid and relatively high boiling components. The acetic acid used in excess for the reaction is directly recyled from the sump of the first column to the reaction.

It is possible by virtue of this distillation arrangement to obtain a polymerisable vinyl acetate meeting the specification desired. This particular procedure, however, is only one of several possible methods of isolating a pure vinyl acetate from the reaction mixture.

Polymerisable, monomeric organic substances usually are kept substantially free of oxygen during working up, above all during distillation. For example, it is common practice to remove dissolved gases which may still contain some oxygen from liquid monomeric polymerisable substances before they are introduced into a distillation stage. In order to avoid subsequent contact with oxygen, all the distillation columns and storage tanks are usually flushed with nitrogen.

In working up a crude reaction mixture to isolate pure vinyl acetate, every effort is made, usually by the addition of inhibitors, to prevent polymerisation. Thus, all of the three columns described above may have inhibitors introduced into them in the usual way. In addition, the crude reaction product is with advantage inhibited immediately after condensation. Suitable inhibitors include any of the commercial substances normally used for this purpose, although for the purposes of the present invention it is preferred to employ inhibitors of the kind which do not contain any atoms other than C, H, and O, for example hydroquinone, tert-butyl phenols and so on. The inhibitor is best used in solution in vinyl acetate. 4-tert.-butyl catechol (4-tert.-butyl-1,2-benzenediol) is preferably used as an inhibitor in the process according to the invention by virtue of its outstanding solubility in contrast to hydroquninoe, for example. The quantities added may vary within a wide range, for example from 0.001 to 0.1 percent by weight of inhibitor, based on recovered vinyl acetate.

In carrying out the distillations described above, a certain quantity of polyvinyl acetate is formed through polymerisation of the monomeric vinyl acetate during distillation despite inhibition. This polymerisation leads to two products: firstly, a polymer which remains in solution in the corresponding products of distillation and, apart from a reduction in yield, does not lead to any technical difficulties; and, in addition, a solid white polymer which is periodically formed in all three of the aforementioned columns. This solid white polymer is not formed in the circulation evaporators themselves, but directly in the columns at specific well-defined points. The formation of these solid polymers interfered seriously with the practical application of the process.

Attempts based on general experience in the distillation of polymerisable monomers to prevent the formation of these polymers by initially removing gases from the product introduced into the distillation column have not been successful. On the contrary, this removal step has been found to favor the formation of the solid polymers.

THIS INVENTION

It has now been found, that the occurrence of these solid polymers in the individual vinyl acetate distillation columns can be avoided by carrying out each distillation in the presence of oxygen. For example, quantities of oxygen of from 0.1 to 100 1(STP), and preferably from 1 to 10 1(STP), per 100 kg. of vinyl acetate are suitable for this purpose. It is particularly useful to introduce the oxygen at the lowest point of the distillation column, i.e. into the lower half of the circulation evaporator. In this way, the column is supplied with oxygen over its entire length, and the oxygen is adequately distributed over the entire column cross-section.

The introduction of pure oxygen into a distillation column presents safety problems and also involves a considerable outlay in terms of control systems. It is therefore of particular advantage to introduce the oxygen in dilute form, for example in the form of air. However, the introduction of gases into a distillation column involves a certain distillation loss because the gas issuing from the head of the column contains a proportion of the vinyl acetate, governed by the vapor pressure. Accordingly, every effort is made to recycle this gas into the process for the production of vinyl acetate. However, nitrogen is continuously introduced into the gas circuit during recycling and has to be removed by purging which is in turn accompanied by a corresponding loss of gaseous starting products, principally ethylene.

One particularly advantageous and economical way of introducing the oxygen according to this invention is to supply it in the form of a mixture of oxygen and carbon dioxide. In the above described process for the production of vinyl acetate, $CO_2$ accumulates as a gaseous secondary product, being removed from the process by a $CO_2$ wash. Thus, $CO_2$ is available. Mixtures of $CO_2$ and oxygen do not involve any real dangers and $CO_2$ entrained into the column through the introduction of oxygen does not present any difficulties because the $CO_2$ is in any event removed by washing. In principle, the ratio of oxygen to carbon dioxide does not have any bearing upon the process according to the invention. Basically, as little carbon dioxide as possible should be introduced to avoid an unnecessary burden on the subsequent $CO_2$ wash. Preferred $CO_2$ proportions are from 20 to 50 percent by volume, based on the oxygen.

EXAMPLES

Example 1.—Comparative

This example described a normal distillation procedure.

Ethylene, oxygen and acetic acid were reacted in a known manner to form vinyl acetate at a temperature of 190° C., and a pressure of 8 atms. over a fixed bed of a noble metal catalyst on a support.

The reaction mixture was cooled to 40° C. and the liquid components were removed from the mixture. The mixture was inhibited by pumping in a solution of 20 percent by weight of 4-tert.-butyl catechol. The inhibitor was added in a quantity of 300 p.p.m., based on the vinyl acetate present in the reaction mixture. The gases were recycled to the process and the liquid condensate was released to normal pressure. The gases liberated during depressurisation were removed and were recycled through a residual gas compressor into the recycled gas. The liquid reaction mixture under normal pressure was worked up by distillation into pure vinyl acetate as follows:

Vinyl acetate and most of the water were azeotropically separated from the acetic acid as the head product of a first distillation column. The product introduced into the distillation column consisted of:

| | Kg./h. |
|---|---|
| Vinyl acetate | 4.543 |
| Acetic acid | 15.034 |
| Water | 1.443 |
| Ethyl acetate | 0.008 |
| Acetaldehyde | 0.048 |
| Unknown | 0.002 |

The distillation column was in the form of a packed column with a sump temperature of 125° C., a head temperature of 70° C. and a reflux ratio of 1:5. An acetic acid fraction was run off from the sump of the column and directly recycled into the reaction. The quantities were as follows:

| | Kg./h. |
|---|---|
| Acetic acid | 15.034 |
| Water | 0.305 |
| Polymers | 0.053 |
| Ethyl acetate | 0.007 |

The azeotrope accumulated as head product of this column, being separated into two phases in a phase separator. The upper organic phase (crude vinyl acetate) accumulated in the following quantities:

| | Kg./h. |
|---|---|
| Vinyl acetate | 4.274 |
| Water | 0.046 |
| Ethyl acetate | 0.001 |
| Acetaldehyde | 0.026 |
| Unknown | 0.002 |

The aforementioned inhibitor solution was introduced into the phase separator from which the reflux was simultaneously run off, in a quantity of 100 p.p.m., based on the vinyl acetate ultimately run off from the column.

The vinyl acetate dissolved in the water was recovered from the lower aqueous phase by stripping with steam and recycled to the inlet end of the distillation column.

100 1 (STP) /hour of gaseous products, which had originally been dissolved in the cold product introduced into the distillation column, escaped from the condensate container of the column. Analysis of this gas was as follows:

| | Percent by volume |
|---|---|
| Ethylene | 69.4 |
| Acetic acid | 0.4 |
| Water | 0.3 |
| $CO_2$ | 26.9 |
| Nitrogen | 0.1 |
| Vinyl acetate | 2.1 |
| Acetaldehyde | 0.7 |
| Oxygen | less than 0.1 |

These gases were compressed by the residual gas compressor and returned to the recycle gas.

Blockage through polymerisation occurred at intervals of several weeks in the top third of the column just beneath the product inlet. When the column was opened, an approximately 20 cm. thick plug of solid white polymer was clearly visible. All the remaining parts of the distillation column were completely free from polymer deposits, the polymer plug being regularly formed at exactly the same place.

The crude vinyl acetate accumulating in the distillatin column was delivered to a second distillation column in whieh the water dissolved in the vinyl acetate was azeotropically removed overhead with vinyl acetate together with all low-boiling components, above all acetaldehyde. Following separation of the water, 80 percent of the head product consister of acetaldehyde, the rest being vinyl acetate in addition to small quantities of impurities. The vinyl acetate was recovered from this acetaldehyde/vinyl acetate mixture in a side column, and recycled to the beginning of distillation.

The colomn for removing all the low-boiling components from the vinyl acetate was not additionally inhibited because the inlet of this column, also in the for mof a packed column, is close to the head of the column and the product introduced into it had already been inhibited. The temperatures were 75° C. in the sump and to 62° C. at the head. The column was flushed with pure nitrogen.

Blockages due to the formation of solid polymer plugs occurred in this column too at intervals of several weeks. In this case, too, polymerisation always occurred at the same place in tht lower part of the column some 30 cm. above the circulation evaporator. The polymer was identical in appearance to the polymer from the first column.

Tht now only relatively high boiling crude vinyl acetate containing impurities was delivered from the sump of this column into a redistillation column. Pure vinyl acetate containing 99.95 percent by weight of vinyl acetate accumulated in this redistiation coumn in a quantity of 4.0 kg./hour. Vinyl acetate was run off from the sump of this coluun in a quantity of 200 g./hour and was recycled into the first column. This was done to prevent relativtly high boiling products, especially polymers from accumulating in the sump of the column. The sump temperature amounted to 75° C. and the head temperature to 72° C. The column was flushed with pure nitrogen. A 1 percent solution of hydroquinone in vinyl acetate was pumped as inhibitor into the condensatt container from which the reflux was also taken. The inhibitor was added in a quantity of 100 p.p.m., baset on the vinyl acetate run off.

This column was particularly prone to tlockage through solid polymer deposits. In this case, blockages occurred regularly at intervals of a few days. As with the other columns, the polymer plug was always formed at a specifii point, in this case, at the lowest point of the column some 30 to 50 cm. above the circulation evaporator. The appearance of the plug was as described above.

Example 2.—Comparativt

This example describes distillation of the crude vinyl acetate present in the complett absence of oxygen.

Distillation was carried oht in the same arrangement as described in Example 1.

To remove gases from the cold liquid product for introtuction into the distillation column, the distillation column was preceded by a gas separation column. The gas separation column consisted of a normal packed column provided at its head with a water-cooled dephlegmator.

The gas mixture run off from tht head of the first azeotropic distillation column in Example 1 was run off in substantially the samt composition in the gas separation column. The sump product from the gas separation column was fed directly, i.e. without intermediate cooling, into the azeotropic distillation column which was now flushed with nitrogen. The subsequent distillation cycle was almost impossible to complete under these conditions because the first distillation column was blocked every three to four days at the place described in Example 1.

Example 3.—This Invention

This example describes the distillation process according to the invention in which oxygen is delivered into the individual columns.

The distillation cycle was the same as in Example 1 as were the operating conditions of the individual columns. A small nozzle was welded into the lower end of the circulation evaporator of each of the three distillation columns described above. A mixture of 2 l (STP)/h. of oxygen and 8 l. (STP)/h of $CO_2$ was introduced through this nozzle. The oxygen was taken from the main fresh supply of oxygen to the reactor, while the $CO_2$ originated from the desorber of the $CO_2$ wash, carried out in known manner.

The gas mixture delivered into the distillation column was run off from the condensate container laden with vinyl acetate in quantities corresponding to the vapor pressure and recycled through the compressor mentioned in Example 1 into the pressure section of the recycle gas stream.

No solid polymers had been formed in the distillation columns even after this distillation arrangement according to the invention had been in operation for several months.

We claim:

1. In a process of purifying crude liquid vinyl acetate wherein crude vinyl acetate is distilled in a plurality of distillation columns; the improvement comprising introducing free oxygen, in addition to any oxygen contained in said crude liquid vinyl acetate, into the individual vinyl acetate distillation columns in such manner as to ensure that oxygen is present throughout each distillation column.

2. The process as claimed in Cliam 1 wherein said crude vinyl acetate is the produit of the reaction of ethylene, oxygen and acetic acid in the presence of a noble metal catalyst.

3. The process as claimed in Claim 1 wherein said free oxygen is delivered into each individual vinyl acetate column in a quantity of from 0.1 to 100 liters, at standard temperature and pressure, per 100 kilograms of vinyl acetate.

4. The process as claimed in Claim 1 wherein said free oxygen is introduced into the lower half of a circulation evaporator constituting the boiler part of the distillation column.

5. The process as claimed in Clair 2 wherein said free oxygen is used in dilute form and the gases evolved from the system are returned to the reaction.

6. The process as claimed in Claim 5 wherein $CO_2$ is used as a diluent for the oxygen.

7. The process according to Claim 6 wherein 20–50 volumn percent $CO_2$ based on said free oxyien is used.

8. In a process of purifying crude liquid vinyl acetate wherein crude vinyl acetate is distilled in a plurality of distillation columns in the presence of a polymerization inhibitor; the improvement comprising introducing free oxygen, in addition to any oxygen contained in said crude liquid vinyl acetate, into the individual vinyl acetate distillation columns in such manner as to ensure that oxygen is present throughout each distillation column.

9. [The process as claimed in Claim 8, whtrtin 1 to 10 liters, at standard temperature and pressure, of $O_2$ per hour per 100 kg. of vinyl acetate are introduced into each column.

10. The process according to Claim 8, wherein said polymerization inhibitor is a compound which consists solely of C, H and O atoms.

11. The process according to Claim 10, wherein said inhibitor is 4-tert. butyl-catechol.

12. The process according to Claim 10, wherein the total amount of said inhibitor is from 0.001 to 0.1 weight percent based on recovered vinyl acetate.

References Cited

UNITED STATES PATENTS

| | | | |
|---|---|---|---|
| 3,404,177 | 10/1968 | Baba et al. | 260—497 A |
| 3,239,433 | 3/1966 | Costolow | 203—8 |
| 2,399,340 | 4/1946 | Frany | 203—9 |
| 2,171,795 | 9/1939 | Kautter | 203—65 |
| 3,530,044 | 9/1970 | Horn | 260—497 A |

WILBUR L. BASCOMB, JR., Primary Examiner

U.S. Cl. X.R.

203—49; 260—497 A, 499